US011080767B2

(12) United States Patent
VanDuyn

(10) Patent No.: US 11,080,767 B2
(45) Date of Patent: *Aug. 3, 2021

(54) SYSTEMS AND METHODS FOR CREATING AN INTERSTITIAL AD EXPERIENCE WITHIN A SCROLLING CONTENT FRAME

(71) Applicant: Google LLC, Mountain View, CA (US)

(72) Inventor: Isaac Sterling VanDuyn, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/581,078

(22) Filed: Sep. 24, 2019

(65) Prior Publication Data

US 2020/0019999 A1 Jan. 16, 2020

Related U.S. Application Data

(63) Continuation of application No. 14/866,000, filed on Sep. 25, 2015, now Pat. No. 10,430,840.

(Continued)

(51) Int. Cl.
*G06Q 30/02* (2012.01)
*G06F 3/0485* (2013.01)
(Continued)

(52) U.S. Cl.
CPC ....... *G06Q 30/0277* (2013.01); *G06F 3/0485* (2013.01); *G06F 3/04855* (2013.01); *G06F 40/14* (2020.01); *G06F 40/166* (2020.01)

(58) Field of Classification Search
CPC ... G06Q 30/0277; G06F 40/14; G06F 40/166; G06F 3/0485; G06F 3/04855
See application file for complete search history.

(56) References Cited

U.S. PATENT DOCUMENTS 6,157,381 A * 12/2000 Bates .................. G06F 3/04855
345/684
6,757,716 B1 6/2004 Blegen et al.
(Continued)

OTHER PUBLICATIONS

International Search Report for EP Appln. Ser. No. 19201978.4 dated Jan. 9, 2020 (8 pages).
(Continued)

*Primary Examiner* — Mario C. Iosif
(74) *Attorney, Agent, or Firm* — Foley & Lardner LLP

(57) ABSTRACT

Systems and methods for controlling the display of content of information resources are described herein. The system can receive a request for an information resource from a client device. The system can transmit the information resource that can include a first content portion, a second content portion, and a content display management script. The content display management script can include instructions that can cause the client device to: (a) set a scroll range of the information resource from a first location to a second location in the information resource; (b) display, within a portion of the information resource between the first location and the second location, the first content portion and an ad that can include actionable item; and (c) set, responsive to detecting an interaction on the actionable item, the scroll range from the first location to a third location of the information resource.

20 Claims, 7 Drawing Sheets

Related U.S. Application Data

(60) Provisional application No. 62/208,175, filed on Aug. 21, 2015.

(51) Int. Cl.
*G06F 40/14* (2020.01)
*G06F 40/166* (2020.01)

(56) References Cited

U.S. PATENT DOCUMENTS

| | | | |
|---|---|---|---|
| 8,402,157 B2 | 3/2013 | Krassner et al. | |
| 2004/0055007 A1* | 3/2004 | Allport | H04N 21/47 725/39 |
| 2011/0083082 A1* | 4/2011 | Gottwald | G06F 16/957 715/744 |
| 2011/0125594 A1 | 5/2011 | Brown et al. | |
| 2012/0011550 A1 | 1/2012 | Holland | |
| 2012/0023457 A1* | 1/2012 | Lai | G06Q 30/0251 715/863 |
| 2012/0066638 A1* | 3/2012 | Ohri | G06F 3/0485 715/784 |
| 2013/0054972 A1 | 2/2013 | Thorwirth | |

OTHER PUBLICATIONS

"Facebook Now worth more than Wal-Mart on stock market," New York Magazine, dated Jun. 23, 2015 (1 page).
Final Office Action on U.S. Appl. No. 14/866,000 dated Dec. 20, 2018 (15 pages).
International Search Report and Written Opinion for Appln. Ser. No. PCT/US2016/047891 dated Dec. 20, 2016 (13 pages).
International Written Opinion on PCT Appln. Ser. No. PCT/US2016/047891 dated Sep. 27, 2017 (2 pages).
Non-Final Office Action on U.S. Appl. No. 14/866,000 dated Jul. 5, 2018 (13 pages).
Notice of Allowance on U.S. Appl. No. 14/866,000 dated May 16, 2019 (9 pages).
Office Action on EP Appln. Ser. No. 16758044.8 dated Oct. 18, 2018 (4 pages).
The International Preliminary Report on Patentability for PCT Appln. Ser. No. PCT/US2016/047891 dated Feb. 2, 2018 (26 pages).
First Office Action for CN Appln. Ser. No. 201680025895.1 dated Dec. 2, 2020 (13 pages).
Examination Report for IN Appln. Ser. No. 201747034695 dated Sep. 1, 2020 (6 pages).

* cited by examiner

SYSTEMS AND METHODS FOR CREATING AN INTERSTITIAL AD EXPERIENCE WITHIN A SCROLLING CONTENT FRAME

CROSS REFERENCES TO RELATED APPLICATION

This application claims priority under 35 U.S.C. § 120 as a continuation of U.S. patent application Ser. No. 14/866,000, titled "Systems and Methods for Creating an Interstitial Ad Experience Within a Scrolling Content Frame," filed on Sep. 25, 2015, application claims priority under 35 U.S.C. § 119(e) to U.S. Provisional Application No. 62/208,175, titled "Systems and Methods for Creating an Interstitial Ad Experience Within a Scrolling Content Frame," filed on Aug. 21, 2015, each of which is hereby incorporated by reference in its entirety.

BACKGROUND

In a computer networked environment such as the internet, third-party content providers provide third-party content items for display on end-user computing devices. These third-party content items, for example, advertisements, can be linked to web pages associated with the third-party content providers. These third-party content items can include content identifying the third-party content provider that provided the content item.

SUMMARY

At least one aspect is directed to a method of controlling the display of content of information resources. The method can include receiving a request for an information resource from an application executing on a client device. The method can include transmitting the information resource to the client device. The information resource can include at least a first content portion, a second content portion, and a content display management script. The content display management script can include computer-executable instructions, which when executed by a processor of the client device, can cause an application of the client device to set a scroll range of the information resource to a first range extending from a first location in the information resource to a second location in the information resource. The computer-executable instructions can cause the application of the client device to display, within a portion of the information resource between the first location and the second location, the first content portion and an ad. The ad can include an actionable item to set the scroll range of the information resource to a second range. The computer-executable instructions can cause the application of the client device to set, responsive to detecting an interaction on the actionable item of the ad, the scroll range to the second range extending from the first location to a third location of the information resource.

In some implementations, the computer-executable instructions of the content display management script can further cause the application of the client device to identify the first location in the information resource based on a first end of the first content portion and identify the second location in the information resource based on a second end of the ad. In some implementations, the computer-executable instructions of the content display management script can further cause the application of the client device to remove the actionable item from display on the information resource, responsive to detecting the interaction on the actionable item of the content item from the client device. In some implementations, the computer-executable instructions of the content display management script can further cause the application of the client device to determine an amount of time that the ad has been displayed on the information resource and, responsive to determining that the amount of time exceeds a predefined time threshold, enable the actionable item on the content item to receive the interaction.

In some implementations, the computer-executable instructions of the content display management script can further cause the application of the client device to insert the ad between the first content portion and the second content portion and identify the second location based on a position of the ad within the information resource. In some implementations, inserting the ad between the first content portion and the second content portion can include determining a size of a viewport of the application and determining the second location within the information resource such that when a scroll position of the application is at the second location, the ad occupies more than a predetermined percentage of pixels defined by the viewport. In some implementations, the computer-executable instructions of the content display management script can further cause the application of the client device to insert, for display, a second ad including a second actionable item between the second location of the information resource and the third location of the information resource. In some implementations, the computer-executable instructions of the content display management script can further cause the application of the client device to set, responsive to detecting a second interaction on the second actionable item of the second ad, the scroll range to a third range extending from the first location to a fourth location of the information resource.

At least one aspect is directed to a method of controlling the display of content of information resources. The method can include receiving an information resource from a server. The information resource can include at least a first content portion, a second content portion, and a content display management script. The method can include invoking the content display management script responsive to receiving the information resource. The method can include setting, responsive to invoking the content display management script, by the client device, a scroll range of the information resource to a first range extending from a first location in the information resource to a second location in the information resource. The method can include displaying, within a portion of the information resource between the first location and the second location, the first content portion and an ad, the ad including an actionable item to set the scroll range of the information resource to a second range. The method can include setting, responsive to detecting the interaction on the actionable item of the ad, the scroll range to the second range extending from the first location to a third location of the information resource.

In some implementations, the method can further include identifying the first location in the information resource based on a first end of the first content portion. In some implementations, the method can further include identifying the second location in the information resource based on a second end of the ad. In some implementations, the method can further include removing the actionable item from display on the information resource responsive to detecting the interaction on the actionable item of the content item from the client device. In some implementations, the method can further include determining an amount of time that the ad has been displayed on the information resource. In some implementations, the method can further include enabling, responsive to determining that the amount of time exceeds a predefined time threshold, the actionable item on the content item to receive the interaction.

In some implementations, the method can further include determining a size of a viewport of the application and determining the second location within the information resource such that when a scroll position of the application is at the second location the ad occupies more than a predetermined percentage of pixels defined by the viewport. In some implementations, the method can further include inserting, for display, a second ad including a second actionable item between the second location of the information resource and the third location of the information resource. In some implementations, the method can further include setting, responsive to detecting a second interaction on the second actionable item of the second ad, the scroll range to a third range extending from the first location to a fourth location of the information resource.

At least one aspect is directed to a system for controlling the display of content of information resources. The system can include a scroll range setting module executed on one or more processors that can set a scroll range of an information resource to a first range extending from a first location in the information resource to a second location in the information resource. The information resource can include at least a first content portion and a second content portion. The system can include a content display module executed on the one or more processors that can display within a portion of the information resource on an application between the first location and the second location, the first content portion and an ad. The ad can include an actionable item to set the scroll range of the information resource to a second range. The system can include a content item interaction detection module executed on the one or more processors that can detect an interaction on the actionable item of the ad. The scroll range setting module can set the scroll range to the second range extending from the first location to a third location of the information resource, responsive to detecting an interaction on the actionable item of the ad.

In some implementations, the scroll range setting module can identify the first location in the information resource based on an initial end of the first content portion. In some implementations, the scroll range setting module can identify the second location in the information resource based on a final end of the advertisement. In some implementations, the scroll range setting module can insert the ad between the first content portion and the second content portion and can determine the second location based on a position of the ad within the information resource. In some implementations, the scroll range setting module can determine a size of a viewport of the application and can determine the second location within the information resource such that when a scroll position of the application is at the second location, the ad occupies more than a predetermined percentage of pixels defined by the viewport. In some implementations, the scroll range setting module can insert, for display, a second ad including a second actionable item between the second location of the information resource and the third location of the information resource. In some implementations, the scroll range setting module can set, responsive to detecting a second interaction on the second actionable item of the second ad, the scroll range to a third range extending from the first location to a fourth location of the information resource.

In some implementations, the content item interaction detection module can remove the actionable item from display on the information resource, responsive to detecting the interaction on the actionable item of the content item from the client device. In some implementations, the content item interaction detection module can determine an amount of time that the first content portion has been provided for display on the information resource. In some implementations, the content item interaction detection module can enable, responsive to determining that the amount of time exceeds a predefined time threshold, the actionable item on the content item to receive the interaction.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
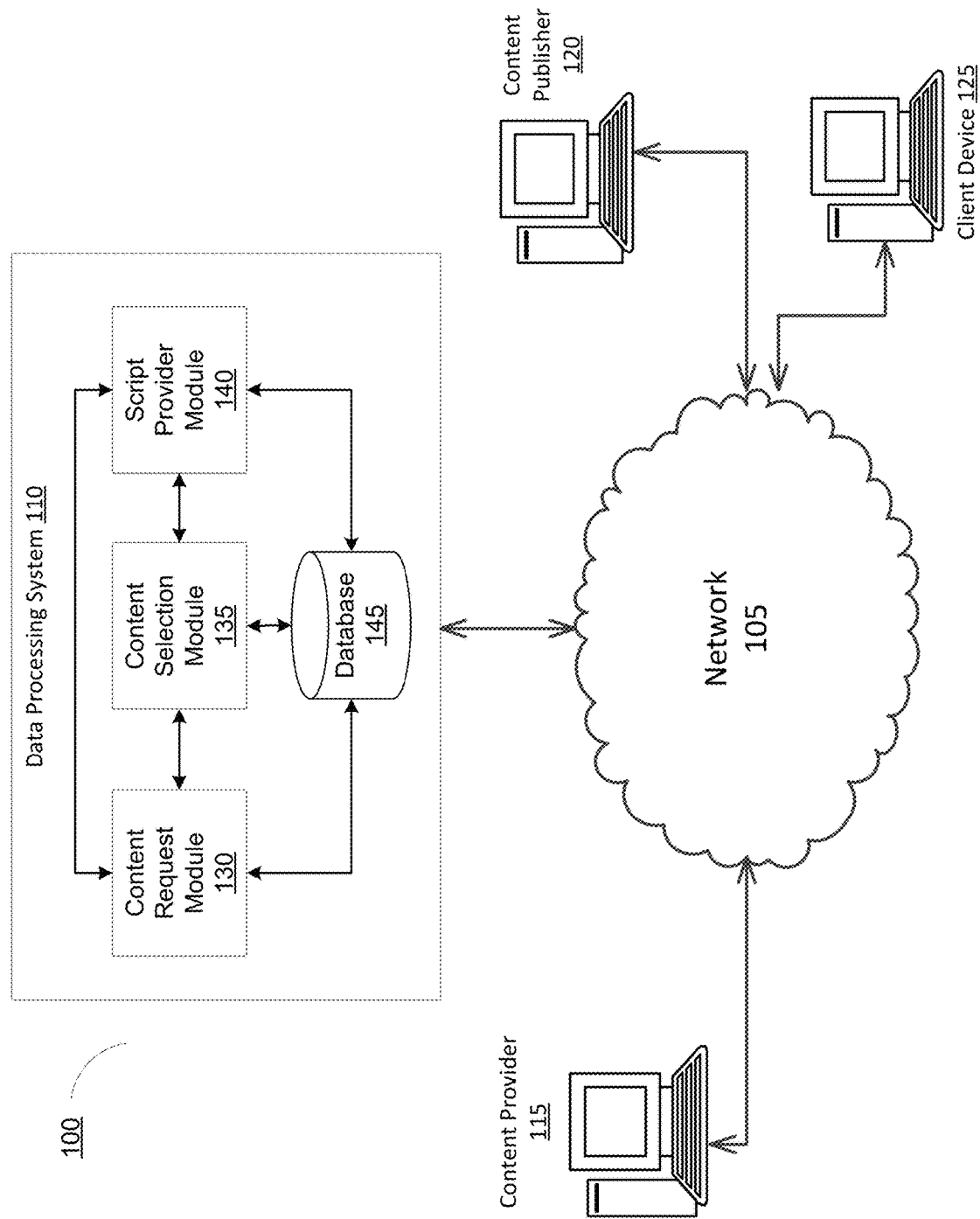
FIG. 1 is a block diagram depicting one implementation of an environment for controlling the display of content of information resources in a computer network environment, according to an illustrative implementation.

Following below are more detailed descriptions of various concepts related to, and implementations of, methods, apparatuses, and systems of controlling the display of content of information resources in a computer network environment. The various concepts introduced above and discussed in greater detail below may be implemented in any of numerous ways, as the described concepts are not limited to any particular manner of implementation.

Interstitial ads typically may occupy the entirety of a viewport of an application executing on a device. Examples of such applications executing on a device include a mobile application executing on a smartphone or a web browser executing on a laptop. Interstitial ads have higher conversion rates than many other forms of online advertising. The present disclosure is directed towards technologies for providing an interstitial ad like experience when displaying an information resource that includes freely scrollable content, such as a long article displayed on a webpage.

The technology relates to setting scroll ranges within an information resource (such as a webpage or a page of an application) that includes content that is unable to be displayed within a viewport of the application. All of the content of an information resource may not fit into a viewport of the application, or stated in another way, the area available for display through the application. A user may use the scrolling feature of the application to view various portions of the content. A scroll range may be set to define the range, amount, or area of the information resource available for display. In this way, by strategically setting the scroll range to extend from a first position to a second position just after an ad, for example, if the ad is sized to match the viewport of the browser or application via which the information resource is displayed, the ad will provide an interstitial ad experience when the scroll box has reached the end of the scroll range corresponding to the second location. The ad can include an actionable item configured to cause the application displaying the information resource to adjust the scroll range of the information resource. When a user interacts with the actionable item, the scroll range can be increased or extended, thereby allowing the user to view additional content of the information resource that may have been loaded when the information resource was loaded but was unable to be displayed within the viewport of the application because the additional content was outside the scroll range set by the application.

The technology described herein can be implemented by inserting a script into the information resource, which can cause the application of the computing device via which to display the information resource, to set the scroll range of the information resource, detect an interaction on the actionable item, and then adjust the scroll range of the information resource responsive to detecting the interaction on the actionable item of the ad.

In some implementations, by implementing this technology, multiple pages of content can be stitched together or otherwise included in a single page while still maintaining a content publisher's ability to offer an interstitial ad experience. As interstitial ads may generate additional revenue for content publishers when compared to using traditional banner ads, providing webpages that are able to display interstitial ads or provide an interstitial ad experience may be desirable to content publishers. Further, by implementing this technology, the same content can be displayed by requesting and retrieving only one page instead of multiple pages, thereby eliminating the load times between the different pages. Further, by allowing a user to scroll back to the first end of the information resource after extending the scroll range, the user can view the ad by scrolling towards the first end of the information resource. In contrast, in traditional interstitial ads, once a user decides to skip the ad, the user can no longer visit the same ad.

At least one aspect is directed to a computerized method for controlling the display of content of information resources. A data processing system including one or more processors can receive a request for an information resource from a client device via an application executing on the client device. The data processing system can transmit, responsive to receiving the request for the information resource from the client device, the information resource including at least a first content portion, a second content portion, and a content display management script. The content display management script can include computer-executable instructions, which when executed by a processor of the client device, causes the application of the client device to set a scroll range of the information resource to a first range extending from a first location in the information resource to a second location in the information resource. The computer-executable instructions can cause the application of the client device to display, within a portion of the information resource between the first location and the second location, the first content portion and an ad. The ad can include an actionable item to set the scroll range of the information resource to a second range. The computer-executable instructions can cause the application of the client device to set, responsive to detecting an interaction on the actionable item of the ad, the scroll range to the second range extending from the first location to a third location of the information resource.

FIG. 1 is a block diagram depicting one implementation of an environment for controlling the display of content of information resources. The environment 100 includes at least one data processing system 110. The data processing system 110 can include at least one processor and a memory, i.e., a processing circuit. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system can include one or more computing devices or servers that can perform various functions. In some implementations, the data processing system can include an advertising auction system configured to host auctions. In some implementations, the data processing system does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, for instance with at least one content provider computing device 115, at least one content publisher computing device 120, or at least one client device 125. The network 105 may be any form of computer network that relays information between the user computing device 115, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The content provider computing devices 115 can include servers or other computing devices operated by a content provider entity to provide content items such as advertisements for display on information resources at the client device 125. The content provided by the content provider computing device 115 can include third party content items or creatives (e.g., ads) for display on information resources, such as a website or web page that includes primary content, e.g. content provided by the content publisher computing device 120. The content items can also be displayed on a search results web page. For instance, the content provider computing device 115 can provide or be the source of ads or other content items for display in content slots of content web pages, such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other client device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing devices 115. For instance, the content publisher computing device 120 can operate the web site of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine web site. The primary content of search engine web pages (e.g., a results or landing web page) can include results of a search as well as third party content items displayed in content slots such as content items from the content provider computing device 115. In some implementations, the content publisher computing device 120 can include a server for serving video content.

The end user computing devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The client device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The end user computing devices 125 can be communication devices through which an end user can submit requests to receive content. The requests can be requests to a search engine and the requests can include search queries. In some implementations, the requests can include a request to access a web page.

The content provider computing devices 115, the content publisher computing device 120 and the end user computing devices 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing devices 115, the content publisher computing devices 120, and the end user computing devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the end user computing devices 125 (e.g., a built-in display, microphone, etc.) or external to the housing of content provider computing devices 115, the content publisher computing device 120 and the end user computing devices 125 (e.g., a monitor connected to the user computing device 115, a speaker connected to the user computing device 115, etc.), according to various implementations. For example, the content provider computing devices 115, the content publisher computing device 120 and the end user computing devices 125 may include an electronic display, which visually displays web pages using webpage data received from one or more content sources and/or from the data processing system 110 via the network 105. In some implementations, a content placement campaign manager or third-party content provider, such as an advertiser, can communicate with the data processing system 110 via the content provider computing devices 115. In some implementations, the advertiser can communicate with the data processing system 110 via a user interface displayed on the user interface devices of the content provider computing devices 115.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one content request module 130, at least one content selection module 135, at least one script provider module 140 and at least one database 145. The content item selection 130, the content selection module 135 and the script provider module 140 each can include at least one processing unit, server, virtual server, circuit, engine, agent, appliance, or other logic device such as programmable logic arrays configured to communicate with the database 145 and with other computing devices (e.g., the content provider computing device 115, the content publisher computing device 120, or the client device 125) via the network 105.

The content request module 130, the content selection module 135, and the script provider module 140 can include or execute at least one computer program or at least one script. The content request module 130, the content selection module 135, and the script provider module 140 can be separate components, a single component, or part of the data processing system 110. The content request module 130, the content selection module 135, and the script provider module 140 can include combinations of software and hardware, such as one or more processors configured to execute one or more scripts.

The data processing system 110 can also include one or more content repositories or databases 145. The databases 145 can be local to the data processing system 110. In some implementations, the databases 145 can be remote to the data processing system 110 but can communicate with the data processing system 110 via the network 105. The databases 145 can include web pages, portions of webpages, content items (e.g., advertisements), and content display management script, among others, to serve to a client device 125. In some implementations, the web pages, portions of webpages, and content items (e.g., advertisements) can include those illustratively depicted in FIGS. 3A-3C. Additional details of the contents of the database 145 will be provided below.

The content request module 130 can receive a request for content from the client device 125. The request for content can include a request for an information resource (e.g., a webpage or a page for an application) and a request for a content item (e.g., advertisement), among others. The request for content can include an address or identifier for the information resource or the content item. For example, the request for content can include Uniform Resource Locator (URL) referring to a specific resource such as a webpage (e.g., "https://www.example.com/homepage.html"). In some implementations, the content request module 130 can receive a request for an information resource that can include an indicator indicating a content display management script. For example, the request for the information resource can include a header including an indicator specifying the content request module 130 to send the content display management script along with the information resource to the client device 125.

The content selection module 135 can determine the content to transmit to the client device 125. The content selection module 135 can identify the address or identifier for the information resource and the content item included in the request for content. The content selection module 135 can access the database 145 and select the information resource or the content item identified by the address or identifier. The information resource can include one or more content portions provided by a content publisher 120. For example, a web page containing a news article may be divided by every two to three paragraphs of text. The content item can include static text or image ads, video ads, and audiovisual ads provided by a content provider 115. In some implementations, the content included in the information resource may be divided by the content publisher into multiple content portions. In some implementations, the content included in the information resource may be divided by the content request module 130 into multiple content portions. In some implementations, the content request module 130 can divide the content into multiple content portions by analyzing a DOM tree of the information resource. In particular, the content request module 130 can identify certain DOM elements in the DOM tree and divide the content based on the DOM elements. For instance, each DOM element corresponding to a paragraph or a title can be treated as an individual content portion.

In some implementations, the content selection module 135 can identify a type of request. In some implementations, the content selection module 135 can determine whether to transmit the content display management based on the request for content received from the client device 125. The content selection module 135 can determine whether the type of request corresponds to a request suitable to transmit a content display management script that can cause the client device 125 to provide an interstitial ad experience by setting a scroll range based on a location or a scroll position of a content item within the information resource. The location or scroll position can be, for example, the position of a scroll box relative to and within a scroll bar. The location or scroll position can also be, for example, the pixel coordinate or scaled coordinate of the number of pixels in the horizontal and vertical axes hidden from view to the left (x-axis) and above (y-axis) respectively. In some implementations, the content selection module 135 can also select a content item for display within the information resource. In some implementations, the content selection module 135 can receive the content item from an ad auction system that can select ads for display based on an ad auction. The ad auction system can select an ad from a plurality of ads based on ad auction parameters, such as bid values, size of ad, click-through rate (CTR), cost per mille (CPM), and impression rate, among others.

The script provider module 140 can transmit the content to the client device 125. The content transmitted to the client device 125 can include at least a first content portion, a second content portion, and a content display management script. The content display management script can include computer-executable instructions. The computer-executable instructions can include a script, such as HyperText Markup Language (HTML), Extensible HyperText Markup Language (XHTML), Extensible Markup Language (XML), Cascading Style Sheets (CSS), and JavaScript, among others. The computer-executable instructions can be executed by an application of the client device, for example, the application that caused the client device to transmit the request for content received by the content request module 130. The application can include, for example, an Internet browser, mobile application, or any other computer program capable of reading and executing the computer-executable instructions. In brief overview, the computer-executable instructions, when executed by a processor of the client device 125, can cause an application of the client device to: (a) set a scroll range of the information resource to a first range extending from a first location in the information resource to a second location in the information resource; (b) display, within a portion of the information resource between the first location and the second location, the first content portion and an ad, the ad including an actionable item to set the scroll range of the information resource to a second range; and (c) responsive to detecting an interaction on the actionable item of the ad, set the scroll range to the second range extending from the first location to a third location of the information resource. Additional details relating to the functions of the content display management script are provided herein with respect to FIGS. 2 and 3A-3C.

Figure 2:
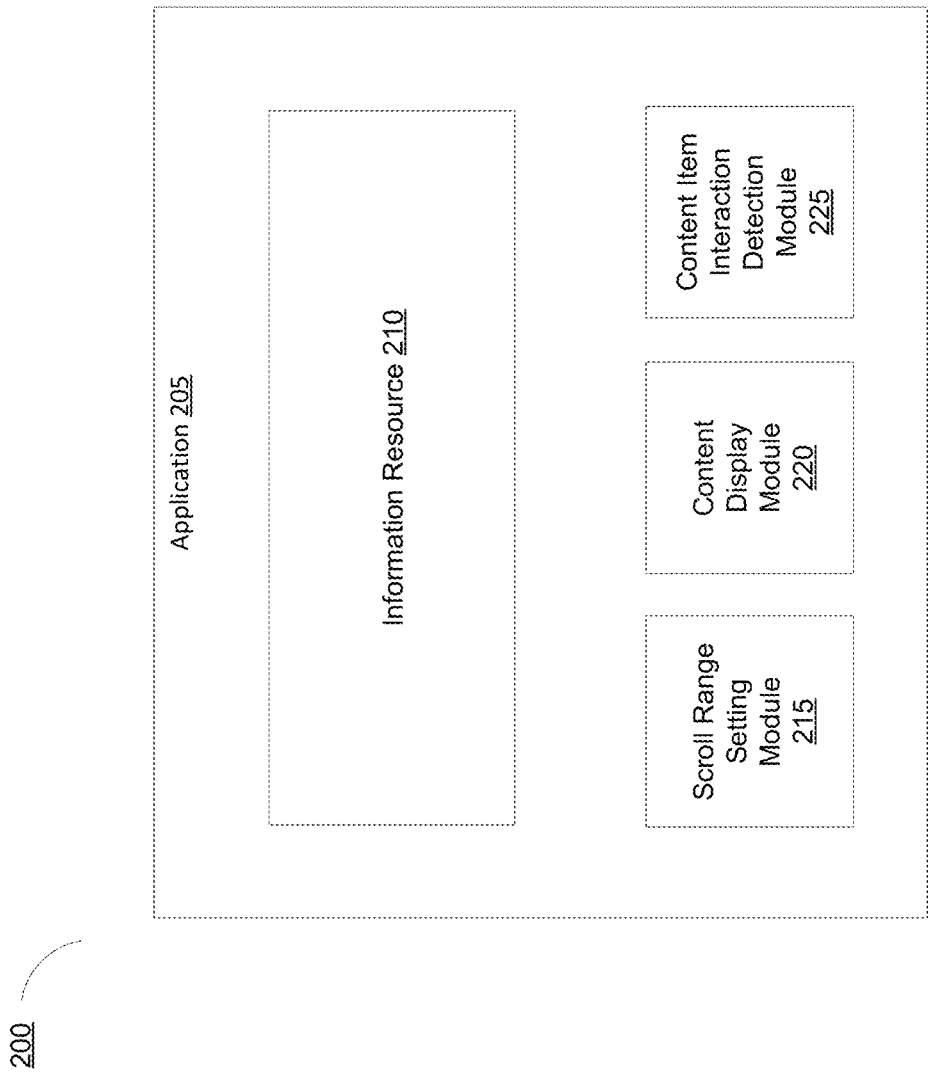
FIG. 2 is a block diagram depicting one implementation of a content display management system, according to an illustrative implementation.

Referring to FIG. 2, FIG. 2 is a block diagram depicting one implementation of a content display management system 200, according to an illustrative implementation. The content display management system 200 can include an application 205, an information resource 210, a scroll range setting module 215, a content display module 220, and a content item detection module 225. The content display management system 200 can be run or otherwise be executed by one or more processors of a computing device, such as those described below in FIG. 5. The application 205 can include, for example, an Internet browser, mobile application, or any other computer program capable of executing or otherwise invoking computer-executable instructions, such as the computer-executable instructions included in the information resource 210, the scroll range setting module 215, the content display module 220, and the content item interaction detection module 225. The information resource 210 can include one or more content portions, such a first content portion and a second content portion. The information resource 210 can specify the positions of the one or more content portions and one or more content items. In some implementations, the information resource 210 can include a Document Object Model (DOM) tree that specifies the shape, size, and positions of one or more content portions. In some implementations, the content portions can correspond to DOM elements that are included in the DOM tree. The information resource 210 can be received by the application 205 along with the scroll range setting module 215, the content display module 220, and the content item interaction detection module 225.

Figure 3A:
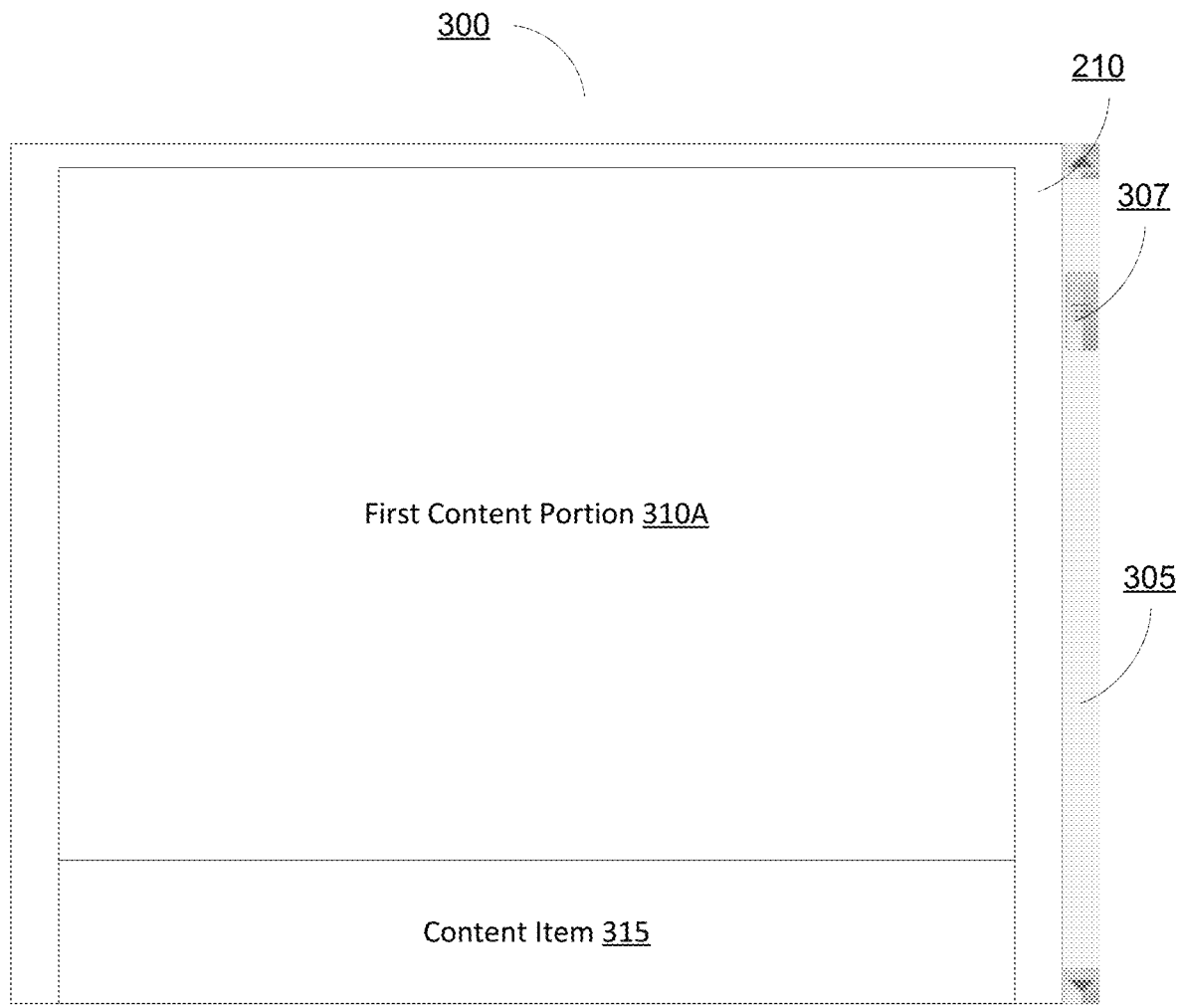
FIG. 3A is a block diagram of a viewport that shows a first content portion and a portion of an ad of an information resource, according to an illustrative implementation.
Figure 3B:
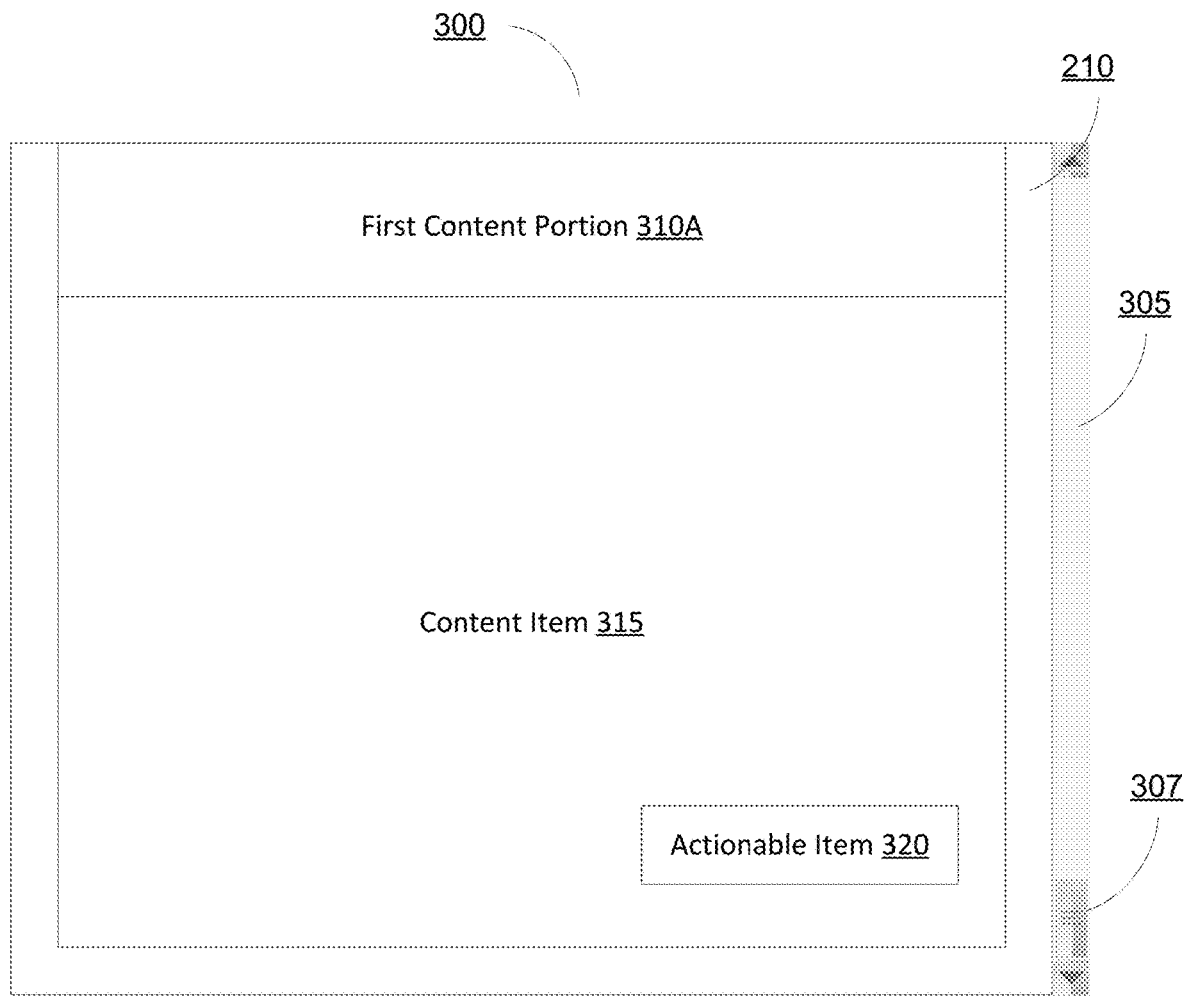
FIG. 3B is a block diagram of the viewport shown in FIG. 3A that shows the ad occupying a majority of the viewport, according to an illustrative implementation.
Figure 3C:
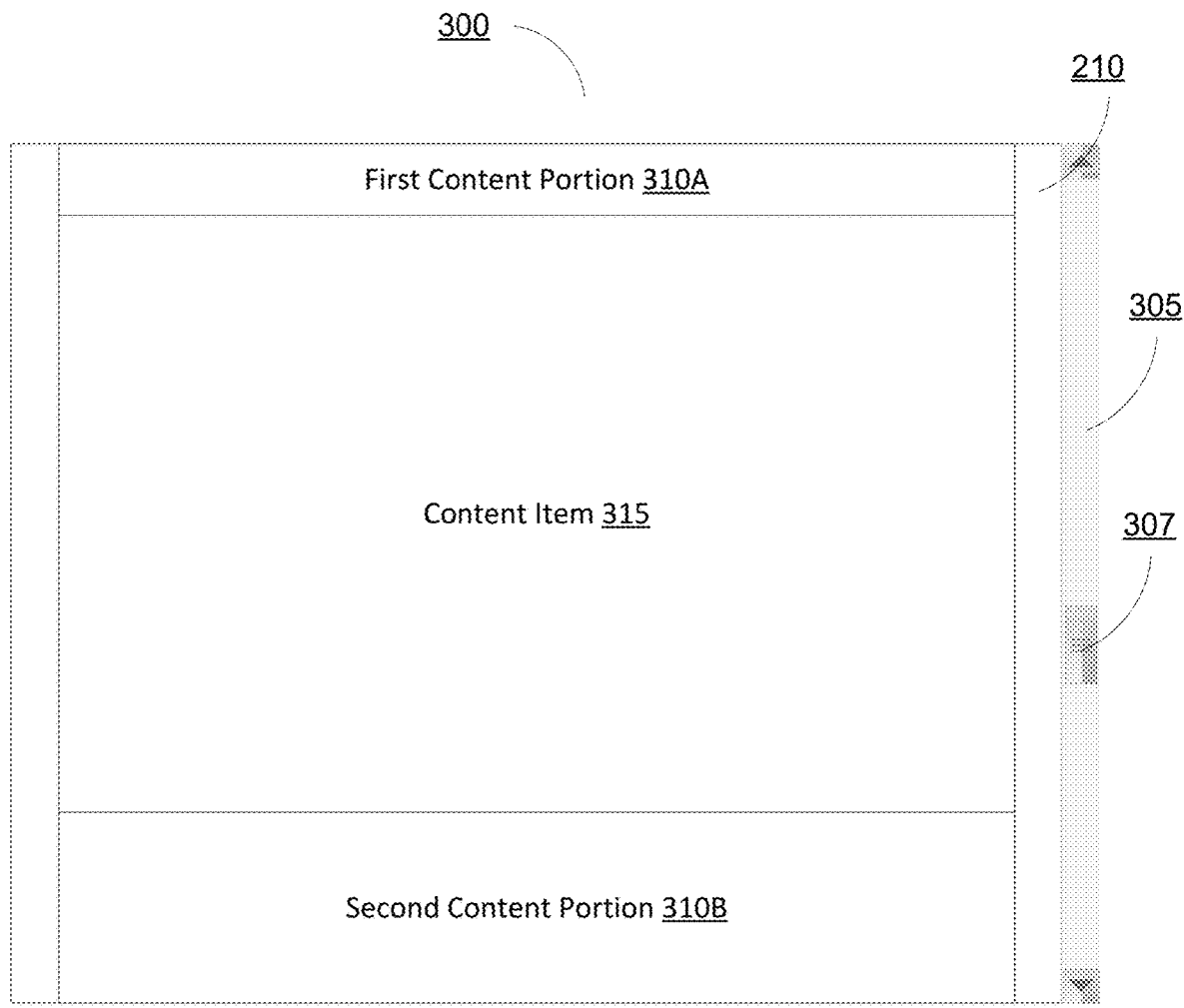
FIG. 3C is a block diagram of viewport shown in FIG. 3A that shows a second portion of the ad and a second content portion on the information resource, according to an illustrative implementation.

Referring to FIGS. 3A-3C, FIGS. 3A-3C are displays each depicting a viewport 300 for controlling the display of content of information resources, according to an illustrative implementation. The viewport 300 can include the portion of the information resource 210 visible through the application 205. The viewport 300 can include, for example, the visible area of the webpage (e.g., information resource 210) through an Internet browser (e.g., application 205). The viewport 300 can display any portion of the information resource 210 visible through the application 205, including one or more content portions such as the first content portion 310A and the second content portion 310B, and content item 315 that can include an actionable item 320. The viewport 300 of the application 205 can be adjusted, shifted, or otherwise be changed by a scroll bar 305. The position of the scroll box 307 relative to where the scroll box 307 is within the scroll bar 305 can indicate which portion of the information resource 210 is being displayed through the viewport 300. In some implementations, the scroll bar 305 can be horizontal and move along the horizontal axis of the information resource 210. In some implementations, the application 205 can indicate the scroll range of the information resource 210 available for scrolling via the scroll bar 305. For example, if the scroll range is limited to the top half of the information resource 210, the application 205 can gray out the bottom half of the scroll bar 305.

In overview, in FIG. 3A, the portion of the information resource 210 visible through the viewport 300 includes the first content portion 310A and the content item 315, with the majority of the viewport 300 covered by the first content portion 310A. FIG. 3A may depict, for example, the top portion of a webpage, such as the information resource 210. In FIG. 3B, the portion of the information resource 210 visible through the viewport 300 includes the first content portion 310A and the content item 315 that can include the actionable item 320, with the majority of the viewport 300 covered by the content item 315. FIG. 3B may depict, for example, the portion of the information resource 210 visible through the viewport 300 when the scroll box 307 at the bottom of the scroll bar 305, indicating that the application is at the end of the scroll range of the information resource 210 as specified by the content display management script. In FIG. 3C, the portion of the information resource 210 visible through the viewport 300 includes the first content portion 310A, the content item 315, and the second content portion 310B. FIG. 3C may depict, for example, the information resource 210 after an interaction (e.g., click or screen tap) has been performed on the actionable item 320, thereby causing the scroll range of the application to expand and show the second content portion 310B.

Referring again to FIG. 2 in conjunction with FIGS. 3A-3C, the scroll range setting module 215 can include instructions to cause the client device 120 to set a scroll range of the information resource 210 to a first scroll range. The scroll range can specify the dimensions or area of the information resource 210 that may be available for scrolling. In some implementations, the scroll range can be set based one or more properties of the information resource 210. For example, the scroll range can be set, for example, using the overflow-y property of the information resource 210 in CSS. In some implementations, the scroll range can be set using a scroll stop numerical parameter specifying a restriction of scrolling past the scroll stop numerical parameter. The first range can extend from a first location in the information resource 210 to a second location in the information resource 210. The first location and the second location can each refer to pixel coordinates or a scaled coordinates (e.g., dots per inch) along the information resource 210, for example, along the horizontal (x-axis) or the vertical (y-axis) of the information resource 210. In some implementations, the scroll range setting module 215 can cause the client device 120 to identify the first location on the information resource 210 based on a first end of the first content portion 310A. The scroll range setting module 215 can cause the client device 120 to also identify the second location on the information resource based on a second end of the content item 315. For example, as depicted in FIG. 3A, if information resource 210 specifies that the first content portion 310A and the content item 315 are sequentially positioned, the first location in the information resource 210 can be at the top position of the first content portion 310A and the second location in the information resource 210 can be at a location slightly below the bottom portion of the content item 315.

In some implementations, the scroll range setting module 215 can include instructions to cause the client device 120 to access the size attributes of the first content portion 310A and the content item 315 to determine the first location in the information resource 210 and the second location in the information resource 210. For example, the scroll range setting module 215 can cause the client device 120 to read or otherwise determine the width and height attributes of the first content portion 310A and the width and height attributes of the content item 315 from the information resource 210. In this example, the scroll range setting module 215 can cause the client device 120 to set the first location (e.g., pixel coordinate or scaled coordinate) of the information resource 210 to a value corresponding to a top of the information resource or a top position of the first content portion 310A. The scroll range setting module 215 can cause the client device 120 to set the second location of the information resource to a second value by adding the two height attributes of the first content portion 310A and the content item 315 to the value of the first location. In some implementations, the scroll range setting module 215 can cause the client device 120 to determine the scroll range based on the DOM elements that specify the shape, size, and positions or one or more elements of the information resource 210. For example, the scroll range setting module 215 can cause the client device 120 to determine the placement of the DOM elements, such as the first content portion 310A and the content item 315, based on the rendering of the specifications of the DOM elements. The scroll range setting module 215 can cause the client device 120 to then render the DOM elements to determine the heights of the first content portion 310A and the content item 315 in the information resource 210. Using the heights of the first content portion 310A and the content item 315, the scroll range setting module 215 can cause the client device 120 to set the first range.

In some implementations, the scroll range setting module 215 can include instructions to cause the client device 120 to determine a size of a viewport 300 of the application 205. The viewport 300 of the application 205 can include the portion of the information resource 210 visible from the application 205. For example, the application 205 can display a 800×300 pixel portion of a 900×1500 pixel sized information resource 210. The size of the viewport 300 can include a pixel dimension (e.g., x by y) of portion of the information resource 210 visible through the application 205. The size of the viewport 300 can be identified or accessed by the scroll range setting module 215 by determining the height and width property of the information resource 210 from the application 205. For example, the scroll range setting module 215 can cause the client device 120 to invoke the function "getViewportSize" in JavaScript to obtain the size of the viewport 300. In some implementations, the scroll range setting module 215 can cause the client device 120 to determine the second location within the information resource 210, such that when the scroll position of the application is at the second location, the ad occupies more than a predetermined percentage of pixels defined by the viewport 300. The predetermined percentage of pixels can include, for example, 50%-100% of the viewport 300 of the application 205. In some implementations, the scroll range setting module 215 can cause the client device 120 to determine the second location within the information resource 210, such that when a scroll position of the application 205 is at the second location, the content item occupies substantially all of the viewport 300. For example, the scroll range setting module 215 can cause the client device 120 to set the second location within the information resource 210 such that the content item occupies 80%-100% of the viewport 300.

It should be appreciated that in some implementations, a size of the viewport of an application may change based on the display of the computing device on which the application is executed. In some implementations, the size of the viewport of an application can be adjusted by a user of the computing device. In some implementations, however, the viewport of the application is based on a size of a display of the computing device on which the application is executing. As such, it is possible that the content management display script provided by the data processing system 110 to include instructions in which the viewport of the application is predefined. In some implementations, the data processing system 110 can determine, from a request for content received from the computing device, a viewport size of the application. In some implementations, the data processing system 110 can determine the viewport size via a database that includes a list of computing devices and a corresponding display size. The viewport size can be based on the display size of the computing device.

In some implementations, the scroll range setting module 215 can include instructions to cause the client device 120 to insert the content item 315 between the first content portion 310A and the second content portion 310B. The scroll range setting module 215 can cause the client device 120 to determine the second location based on a position of the content item 315 within the information resource 210. In some implementations, the scroll range setting module 215 can cause the client device 120 to identify a content item slot (e.g., ad slot) within the information resource 210. The scroll range setting module 215 can cause the client device 120 to determine the position of the content item 315 based on the content item slot. For example, if the ad slot for the information source 210 does not have a definite size or area, insertion of the content item 315 into the DOM elements of the information resource 210 may cause the position of the first content portion 310A or the position of the second content portion 310B to shift. By determining or rendering the DOM elements, the scroll range setting module 215 can account for the lack of definite size of the ad or ad slot and determine the shift in positions of the first content portion 310A and the second content portion 310B, such as the change in pixel dimensions. The scroll range setting module 215 can cause the client device to then determine the position change based on determining or rendering the DOM elements with the content item 315 added. Based on this determination, the scroll range setting module 215 can cause the client device 120 to determine the second location.

In some implementations, the scroll range setting module 215 can include instructions to cause the client device 120 to restrict scrolling beyond the first range on the information resource 120. In some implementations, the scroll range setting module 215 can cause the client device 120 to detect a scroll event on the information resource 120. Responsive to detecting the scroll event on the information resource 120, the scroll range setting module 215 can cause the client device 120 to determine whether the scroll position of the application 200 on the information resource 120 is at the first range or the scroll stop numerical parameter. Responsive to determining that the scroll position is at the first range or the scroll stop numerical parameter, the scroll range setting module 215 can cause the client device 120 to restrict further scrolling and maintain the current scroll position.

The content display module 220 can include instructions to cause the client device 120 to display the portion of the information resource 210 defined by the first range. The first range can include a portion of the information resource 210 between the first location and the second location. In some implementations, the content display module 220 can cause the client device 120 to display, within a portion of the information resource 210 between the first location and the second location, the first content portion 310A and the content item 315. For example, the content display module 220 can cause the client device 120 to display the first content portion 310A and the content item 315 analogous to the illustration in FIG. 3A. In this example, the scroll range set by the scroll set by the scroll range setting module 215 can define the capability of moving or scrolling the scroll box 307 within the scroll bar 305.

The content item interaction detection module 225 can include instructions to cause the client device 120 to detect an interaction on the actionable item 320 of the content item 315. The actionable item 320 can include a button, a link, or any other element, or user interface item capable of receiving the interaction, for example, via an input device of the client device 125. In some implementations, the actionable item 320 can be displayed on or adjacent to the content item 315. For example, as depicted in FIG. 3B, the actionable item 320 can be displayed on the content item 315, generally toward the bottom right of the content item 315. In some implementations, the actionable item 320 may not be part of the content item 315. For example, the actionable item 320 can be another element separate from the content item 315 in the DOM elements of the information resource 210. In this example, the actionable item 320 can be displayed adjacent to the content item 315. In some implementations, the content item interaction detection module 225 can cause the client device 120 to detect a user activation event or triggering event. For example, the content item interaction detection module 225 can detect a click event by receiving a trigger from a user interface event handler or event listener that occurs on the actionable item 320. In another example, the content item interaction detection module 225 can cause the client device 120 to detect a screen touch event at a position within the area specified by the DOM element for the actionable item 320.

In some implementations, the content item interaction detection module 225 can include instructions to cause the client device 120 to remove the actionable item 320 from display on the information resource 210 in response to detecting the interaction on the actionable item 320 of the content item 315. For example, responsive to detecting the click event, the content item interaction detection module 225 can cause the client device to deactivate, disable, hide, or otherwise cause the actionable item 320 to disappear from display. In some implementations, responsive to detecting the interaction on the actionable item 320 of the content item 315, the content item interaction detection module 225 can cause the client device to reset a size of the content item 315. For example, responsive to detecting a click event on the actionable item 320, the content item interaction detection module 225 can cause the client device to reduce the height of the content item to hide the actionable item 320 from display, as depicted in FIG. 3C. In some implementations, the content item interaction detection module 225 may not need to resize the size of the content item 315. For example, if the actionable item 320 is not a part of or displayed within the content item 315, the content item interaction detection module 225 can cause the client device to maintain the size of the content item 315.

In some implementations, the content item interaction detection module 225 can cause the client device 120 to determine an amount of time that the content item 315 has been displayed on the information resource 210. The content item interaction detection module 225 can cause the client device 120 to determine whether the amount of time that the content item 315 has been displayed on the information resource 210 or viewport 300 exceeds a predefined time threshold. The predefined time threshold can range from a 10 ms to 1 second to 10 seconds to 30 seconds to a minute or even more than a minute. The content item interaction detection module 225 can display the actionable item 320 and enable the actionable item 320 for receiving an interaction responsive to determining that the amount of time exceeds a predefined time threshold. For example, suppose the predefined time threshold is 30 seconds. Once the amount of time that the content item 315 has been displayed within the viewport 300 has exceeded 30 seconds, the content item interaction detection module 225 can modify the hidden attribute of the actionable item 320, thereby causing the actionable item 320 to display. The content item interaction detection module 225 at this point can also cause the client device 120 to enable the enable attribute of the actionable item 320, thereby allowing the actionable item 320 to receive the interaction. In some implementations, the content item interaction detection module 225 can cause the client device 120 to enable the actionable item 320 based on an activation policy. The activation policy can include one or more rules for activating the actionable item 320. The one or more rules for activating the actionable item 320 can be time-based, position-based, and scroll-based, among others. For example, the one or more rules of the activation policy can specify that a screen touch event occur in the content item 315 prior to enabling the actionable item.

The scroll range setting module 215 can cause the client device 120 to set a scroll range of the information resource 210 to a second scroll range responsive to the content item interaction detection module 225 causing the client device 120 to detecting the interaction on the actionable item 320. The second range can extend from the first location in the information resource 210 to a third location in the information resource 210. The third location can refer to a position along the information resource 210, for example, along the horizontal (x-axis) or the vertical (y-axis) of the information resource 210. In some implementations, the scroll range setting module 215 can cause the client device 120 to identify the first location on the information resource 210 based on a first end of the first content portion 310A. The scroll range setting module 215 can also cause the client device 120 to identify the third location on the information resource based on a second end of the second content portion 310B. For example, as depicted in FIG. 3B, if information resource 210 specifies that the first content portion 310A, the content item 315, and the second content portion 310B are sequentially positioned, the first location of the scroll range can be positioned at or before the first content portion 310A and the third location of the scroll range can be set at a position, for example, slightly below the bottom portion of the second content portion 310B. In some implementations, the scroll range setting module 215 can access or otherwise identify the size attributes of the first content portion 310A and the second content portion 310B to determine the first location in the information resource 210 and the third location (the location to which to extend the scroll range) in the information resource 210. In some implementations, the scroll range setting module 215 can access the size attributes of the information resource 210 to determine a first end and a second end of the information resource 210. In some implementations, the third location can be set as the bottom of the information resource 210.

The content display module 220 can include instructions to cause the client device 120 to display the portion of the information resource 210 defined by the second range. The second range can include a portion of the information resource 210 between the first location and the third location. In some implementations, the content display module 220 can cause the client device 120 display, within a portion of the information resource 210 between the first location and the third location, the first content portion 310A, the content item 315, and the second content portion 310B. For example, the content display module 220 can cause the client device 120 to display the first content portion 310A, the content item 315, and the second content portion 310B, analogous to the illustration in FIG. 3B. In this example, the scroll range set by the scroll range setting module 215 can cause the client device 120 to define a range within which the scroll box 307 can move or scroll within the scroll bar 305.

In some implementations, the scroll range setting module 215 can include instructions to cause the client device 120 to insert one or more content items, each including an actionable item. In some implementations, the scroll range setting module 215 can cause the client device 120 to insert a second content item that can include a second actionable item between the second location of the information resource 210 and the third location of the information resource 210. Each of the one or more content items can have similar functionalities as described above with respect to the content item 315. The scroll range setting module 215 or the application 205 can cause the client device 120 to stitch together one or more content portions with one or more content items, each pairing of the one or more content portions with a respective content item of the one or more content items having similar functionalities as those described above. For example, the information resource 120 can include a plurality of webpage articles, interspersed with ad slots. The bottom portion of a fourth ad between a fourth article and a fifth article can correspond to a position at which to set the initial scroll range. Responsive to a corresponding actionable item receiving a user interface event such as a click, the scroll range setting module 215 can set the scroll range such that the scroll bar 305 can allow the scroll box 307 to scroll up or past the fifth article in the application 205. In some implementations, the scroll range setting module 215 can insert one or more content items between the various content portions.

In some implementations, the content display management system 200 can be implemented using the following pseudo-code:

```
1    first_range = first_content.height + ad.height
2    second_range = first_range + second_content.height
3    setscrollrange(first_range)
4    if (event on actionable_item)
5        setscrollrange(second_range)
```

In some other implementations, the content display management system 200 can be implemented using the following pseudo-code:

```
1    first_range = first_content.height + ad.height
2    second_range = first_range + second_content.height
3    scroll-stop_range = first_range
4    if ( onscrollevent & scroll_position >= scroll_stop_range)
5        if (event on actionable_item)
6            scroll_stop_range = second_range
7        else
8            maintain scroll_position
```

Figure 4:
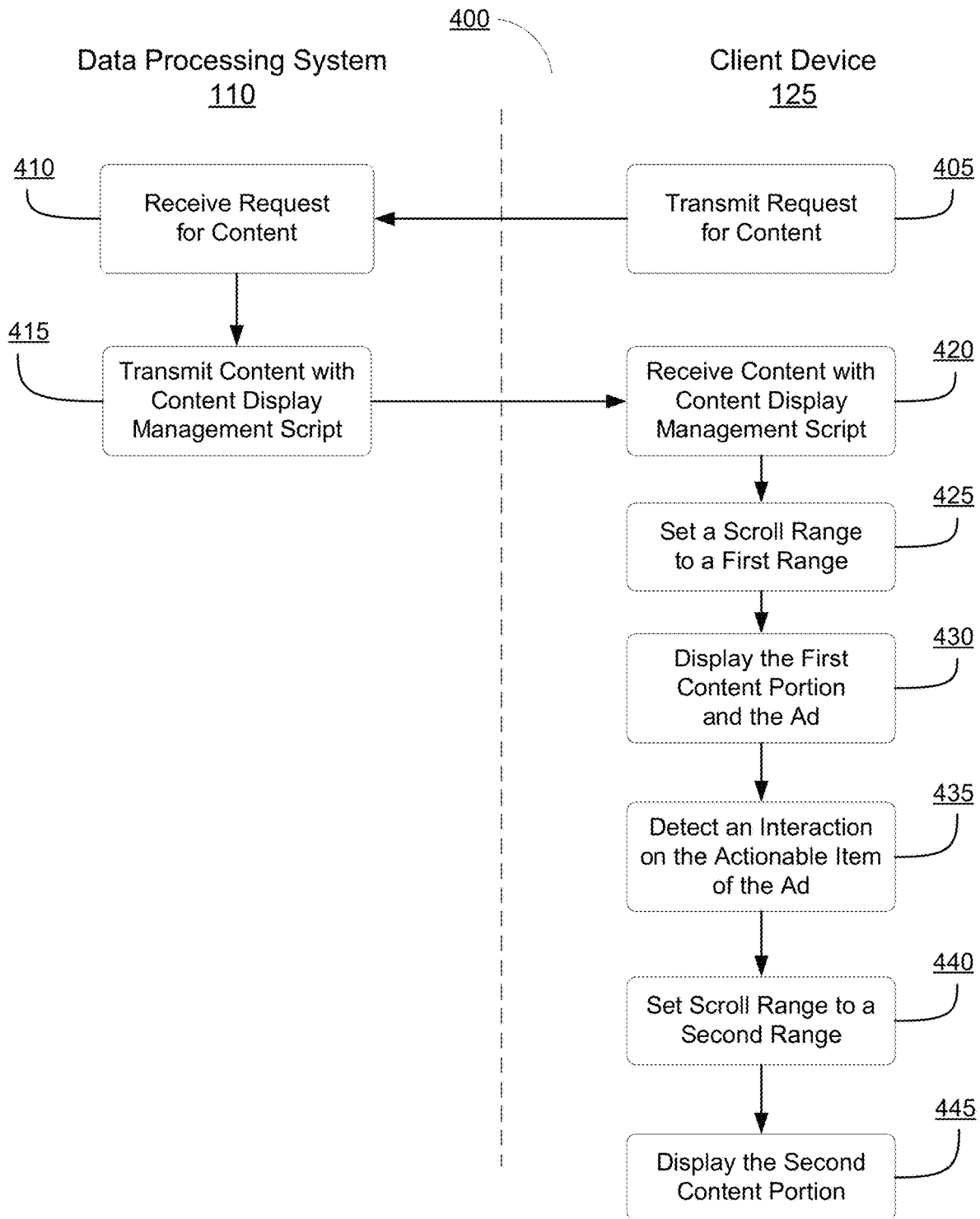
FIG. 4 is a flow diagram depicting a method controlling the display of content of information resources, according to an illustrative implementation.

Referring to FIG. 4, FIG. 4 is a flow diagram depicting a method 400 of controlling the display of content of information resources. In particular, the FIG. 4 is a flow diagram depicting a method 400 of setting and adjusting a scroll range of an information resource based on one or more actions performed on actionable objects inserted within the information resource. The functionality described herein with respect to method 400 can be performed or otherwise executed by the data processing system 110 or client device 125 as shown in FIG. 1 or the content display management system 200 as shown in FIG. 2, or any combination thereof. For example, FIG. 4 depicts the functionalities of the method 400 distributed between the data processing system 110 and the client device 125. In brief overview, the client device can transmit a request for content (BLOCK 405). The data processing system can receive the request for content (BLOCK 410). The data processing system can transmit the content with the content display management script (BLOCK 415). The client device can receive the content with the content display management script (BLOCK 420). The client device can set a scroll range to a first range (BLOCK 425). The client device can display the first content portion and the content item (e.g., ad) (BLOCK 430). The client device can detect an interaction on the actionable item on the content item (BLOCK 435). The client device can set the scroll range to a second range (BLOCK 440). The client device can display the second content portion (BLOCK 445).

The client device can transmit a request for content to the data processing system (BLOCK 405). The request for content can identify a type of device and a viewport size of the application, among others. The type of device for the client device can include, for example, a desktop computer, laptop computer, mobile phone, smartphone, and tablet, among others. The viewport size of the application can be either fixed or variable for the type of device. For example, the viewport size for a mobile phone application may be fixed, whereas the viewport size for an Internet browser on a laptop computer may be variable.

The data processing system can receive a request for content from the client device (BLOCK 410). The request for content can include a request for an information resource (e.g., a webpage or a page for an application) and a request for a content item (e.g., advertisement), among others. The request for content can include an address or identifier for the information resource or the content item. For example, the request for content can include Uniform Resource Locator (URL) referring to a specific resource such as a webpage (e.g., "https://www.example.com/homepage.html"). In some implementations, the data processing system can receive a request for an information resource that can include an indicator indicating a content display management script. For example, the request for the information resource can include a header including an indicator specifying the data processing system to send the content display management script along with the information resource to the client device.

The data processing system can determine the content to transmit to the client device. The data processing system can identify the address or identifier for the information resource and the content item included in the request for content. The data processing system can access the database 145 and select the information resource or the content item identified by the address or identifier. The information resource can include one or more content portions provided by a content publisher 120. For example, a web page containing a news article may be divided by every two to three paragraphs of text. The content item can include static text or image ads, video ads, and audiovisual ads provided by a content provider 115. In some implementations, the content included in the information resource may be divided by the content publisher into multiple content portions. In some implementations, the content included in the information resource may be divided by the data processing system into multiple content portions. In some implementations, the data processing system can divide the content into multiple content portions by analyzing a DOM tree of the information resource. In particular, the data processing system can identify certain DOM elements in the DOM tree and divide the content based on the DOM elements. For instance, each DOM element corresponding to a paragraph or a title can be treated as an individual content portion.

In some implementations, the data processing system can identify a type of request. In some implementations, the data processing system can determine whether to transmit the content display management based on the request for content received from the client device. The data processing system can determine whether the type of request corresponds to a request suitable to transmit a content display management script that can cause the client device to provide an interstitial ad experience by setting a scroll range based on a location or position of a content item within the information resource. In some implementations, the data processing system can also select a content item for display within the information resource. In some implementations, the data processing system can receive the content item from an ad auction system that can select ads for display based on an ad auction. The ad auction system can select an ad from a plurality of ads based on ad auction parameters, such as bid values, size of ad, click-through rate (CTR), cost per mille (CPM), and impression rate, among others.

The data processing system can transmit the content that can include the content display management script to the client device (BLOCK 415). The client device can receive content that can include the content display management script (BLOCK 420). The content transmitted to the client device can include at least a first content portion, a second content portion, and a content display management script. The content display management script can include computer-executable instructions. The computer-executable instructions can include a script, such as HyperText Markup Language (HTML), Extensible HyperText Markup Language (XHTML), Extensible Markup Language (XML), Cascading Styles Sheets (CSS), and JavaScript, among others. The computer-executable instructions can be executed by an application of the client device, for example, the application that caused the client device to transmit the request for content received by the data processing system. The application can include, for example, an Internet browser, mobile application, or any other computer program capable of reading and executing the computer-executable instructions. In brief overview, the computer-executable instructions, when executed by a processor of the client device, can cause an application of the client device to: (a) set a scroll range of the information resource to a first range extending from a first location in the information resource to a second location in the information resource; (b) display, within a portion of the information resource between the first location and the second location, the first content portion and an ad, the ad including an actionable item to set the scroll range of the information resource to a second range; and (c) responsive to detecting an interaction on the actionable item of the ad, set the scroll range to the second range extending from the first location to a third location of the information resource.

The application can include, for example, an Internet browser, mobile application, or any other computer program capable of executing or otherwise invoking computer-executable instructions, such as the computer-executable instructions included in the content display management scrip. The information resource can include one or more content portions, such a first content portion and a second content portion. The information resource can specify the positions of the one or more content portions and one or more content items. In some implementations, the information resource can include a DOM tree that specifies the shape, size, and positions of one or more content portions. In some implementations, the content portions can correspond to DOM elements that are included in the DOM tree. The information resource can be received by the application along with the data processing system, the data processing system, and the data processing system.

The client device can set a scroll range of the information resource to a first scroll range (BLOCK 425). The scroll range can specify the dimensions or area of the information resource that may be available for scrolling. In some implementations, the scroll range can be set based one or more properties of the information resource. For example, the scroll range can be set, for example, using the overflow-y property of the information resource in CSS. In some implementations, the scroll range can be set using a scroll stop numerical parameter specifying a restriction of scrolling past the scroll stop numerical parameter. The first range can extend from a first location in the information resource to a second location in the information resource. The first location and the second location can each refer to positions along the information resource, for example, along the horizontal (x-axis) or the vertical (y-axis) of the information resource. In some implementations, the client device can identify the first location on the information resource based on a first end of the first content portion. The client device can also identify the second location on the information resource based on a second end of the content item. For example, if the information resource specifies that the first content portion and the content item are sequentially positioned, the first location in the information resource can be at the top position of the first content portion and the second location in the information resource can be at a location slightly below the bottom portion of the content item.

In some implementations, the client device can access the size attributes of the first content portion and the content item to determine the first location in the information resource and the second location in the information resource. For example, the client device can read or otherwise determine the width and height attributes of the first content portion and the width and height attributes of the content item from the information resource. In this example, the scroll range setting module can set the first location (e.g., pixel coordinate or scaled coordinate) of the information resource to a value corresponding to a top of the information resource or a top position of the first content portion. The client device can set the second location of the information resource to a second value by adding the two height attributes of the first content portion and the content item to the value of the first location. In some implementations, the client device can determine the scroll range based on the DOM elements that specify the shape, size, and positions or one or more elements of the information resource. For example, the client device can determine the placement of the DOM elements, such as the first content portion and the content item, based on the rendering of the specifications of the DOM elements. The client device can then render the DOM elements to determine the heights of the first content portion and the content item in the information resource. Using the heights of the first content portion and the content item, the client device can set the first range.

In some implementations, the client device can determine a size of a viewport of the application. The viewport of the application can include the portion of the information resource visible from the application. For example, the application can display a 800×300 pixel portion of a 900×1500 pixel sized information resource. The size of the viewport can include a pixel dimension (e.g., x by y) of portion of the information resource visible through the application. The size of the viewport can be identified or accessed by the client device by determining the height and width property of the information resource from the application. For example, the client device can invoke the function "getViewportSize" in JavaScript to obtain the size of the viewport. In some implementations, the client device can determine the second location within the information resource, such that when the scroll position of the application is at the second location, the ad occupies more than a predetermined percentage of pixels defined by the viewport. The predetermined percentage of pixels can include, for example, 50%-100% of the viewport of the application. In some implementations, the client device can determine the second location within the information resource, such that when a scroll position of the application is at the second location, the content item occupies substantially all of the viewport. For example, the client device can set the second location within the information resource such that the content item occupies 80%-100% of the viewport.

In some implementations, the client device can insert the content item between the first content portion and the second content portion. The client device can determine the second location based on a position of the content item within the information resource. In some implementations, the client device can identify a content item slot (e.g., ad slot) within the information resource. The client device can determine the position of the content item based on the content item slot. For example, if the ad slot for the information source does not have a definite size or area, insertion of the content item into the DOM elements of the information resource may cause the position of the first content portion or the position of the second content portion to shift. By determining or rendering the DOM elements, the client device can account for the lack of definite size of the ad or ad slot and determine the shift in positions of the first content portion and the second content portion, such as the change in pixel dimensions. The client device can then determine the position change based on determining or rendering the DOM elements with the content item added. Based on this determination, the client device can determine the second location.

In some implementations, the client device can restrict scrolling beyond the first range on the information resource based on the scroll range. In some implementations, the client device can detect a scroll event on the information resource. Responsive to detecting the scroll event on the information resource, the client device can determine whether the scroll position of the application on the information resource is at the first range or the scroll stop numerical parameter. Responsive to determining that the scroll position is at the first range or the scroll stop numerical parameter, the client device can restrict further scrolling and maintain the current scroll position.

The client device can display the portion of the information resource defined by the first range, such as the first content portion and the content item (BLOCK 430). The first range can include a portion of the information resource between the first location and the second location. In some implementations, the client device can display, within a portion of the information resource between the first location and the second location, the first content portion and the content item. For example, the client device can display the first content portion and the content item. In this example, the scroll range set by the scroll set by the client device can define a range within which the scroll box can move or scroll within the scroll bar.

The client device can detect an interaction on the actionable item of the content item (BLOCK 435). The actionable item can include a button, a link, or any other element, or user interface item capable of receiving the interaction, for example, via an input device of the client device. In some implementations, the actionable item can be displayed on or adjacent to the content item. For example, the actionable item can be displayed on the content item, generally toward the bottom right of the content item. In some implementations, the actionable item may not be part of the content item. For example, the actionable item can be another element separate from the content item in the DOM element DOM elements of the information resource. In this example, the actionable item can be displayed adjacent to the content item. In some implementations, the client device can detect a user activation event or triggering event. For example, the client device can detect a click event by receiving a trigger from a user interface event handler or event listener that occurs on the actionable item. In another example, the client device can detect a screen touch event at a position within the area specified by the DOM element for the actionable item.

In some implementations, the client device can remove the actionable item from display on the information resource in response to detecting the interaction on the actionable item of the content item. For example, responsive to detecting the click event, the client device can deactivate, disable, hide, or otherwise cause the actionable item to disappear from display. In some implementations, responsive to detecting the interaction on the actionable item of the content item, the client device can reset a size of the content item. For example, responsive to detecting a click event on the actionable item, the client device can reduce the height of the content item to hide the actionable item from display. In some implementations, the client device may not need to resize the size of the content item. For example, if the actionable item is not a part of or displayed within the content item, the client device can maintain the size of the content item.

In some implementations, the client device can determine an amount of time that the content item has been displayed on the information resource. The client device can determine whether the amount of time that the content item has been displayed on the information resource or viewport exceeds a predefined time threshold. The predefined time threshold can range from a 10 ms to 1 second to 10 seconds to 30 seconds to a minute or even more than a minute. The client device can display the actionable item and enable the actionable item for receiving an interaction responsive to determining that the amount of time exceeds a predefined time threshold. For example, suppose the predefined time threshold is 30 seconds. Once the amount of time that the content item has been displayed within the viewport has exceeded 30 seconds, the client device can modify the hidden attribute of the actionable item, thereby causing the actionable item to display. The client device at this point can also enable the enable attribute of the actionable item, thereby allowing the actionable item to receive the interaction. In some implementations, the client device can enable the actionable item based on an activation policy. The activation policy can include one or more rules for activating the actionable item. The one or more rules for activating the actionable item can be time-based, position-based, and scroll-based, among others. For example, the one or more rules of the activation policy can specify that a screen touch event occur in the content item prior to enabling the actionable item.

The client device can set a scroll range of the information resource to a second scroll range, responsive to the content item interaction module detecting the interaction on the actionable item of the content item (BLOCK 440). The second range can extend from the first location in the information resource to a third location in the information resource. The third location can refer to a position along the information resource, for example, along the horizontal (x-axis) or the vertical (y-axis) of the information resource. In some implementations, the client device can identify the first location on the information resource based on a first end of the first content portion. The client device can also identify the third location on the information resource based on a second end of the second content portion. For example, if information resource specifies that the first content portion, the content item, and the second content portion are sequentially positioned, the first location of the scroll range can be positioned at or before the first content portion and the third location of the scroll range can be set at a position, for example, slightly below the bottom portion of the second content portion. In some implementations, the client device can access or otherwise identify the size attributes of the first content portion and the second content portion to determine the first location in the information resource and the third location (the location to which to extend the scroll range) in the information resource. In some implementations, the client device can access the size attributes of the information resource to determine a first end and a second end of the information resource. In some implementations, the third location can be set as the bottom of the information resource.

The client device can display the portion of the information resource defined by the second range, such as the second content portion (BLOCK 445). The second range can include a portion of the information resource between the first location and the third location. In some implementations, the client device can display, within a portion of the information resource between the first location and the third location, the first content portion, the content item, and the second content portion. For example, the client device can display the first content portion, the content item, and the second content portion. In this example, the scroll range set by the client device can define the capability of moving or scrolling the scroll box within the scroll bar.

In some implementations, the client device to insert one or more content items, each including an actionable item. In some implementations, the client device can insert a second content item that can include a second actionable item between the second location of the information resource and the third location of the information resource. Each of the one or more content items can have similar functionalities as described above with respect to the content item. The application of the client can stitch together one or more content portions with one or more content items, each pairing of the one or more content portions with a respective content item of the one or more content items having similar functionalities as those described above. For example, the information resource can include a plurality of webpage articles, interspersed with ad slots. The bottom portion of a fourth ad between a fourth article and a fifth article can correspond to a position at which to set the initial scroll range. Responsive to a corresponding actionable item receiving a user interface event such as a click, the client device can set the scroll range such that the scroll bar can allow the scroll box to scroll up or past the fifth article in the application. In some implementations, the client device can insert one or more content items between the various content portions.

Figure 5:
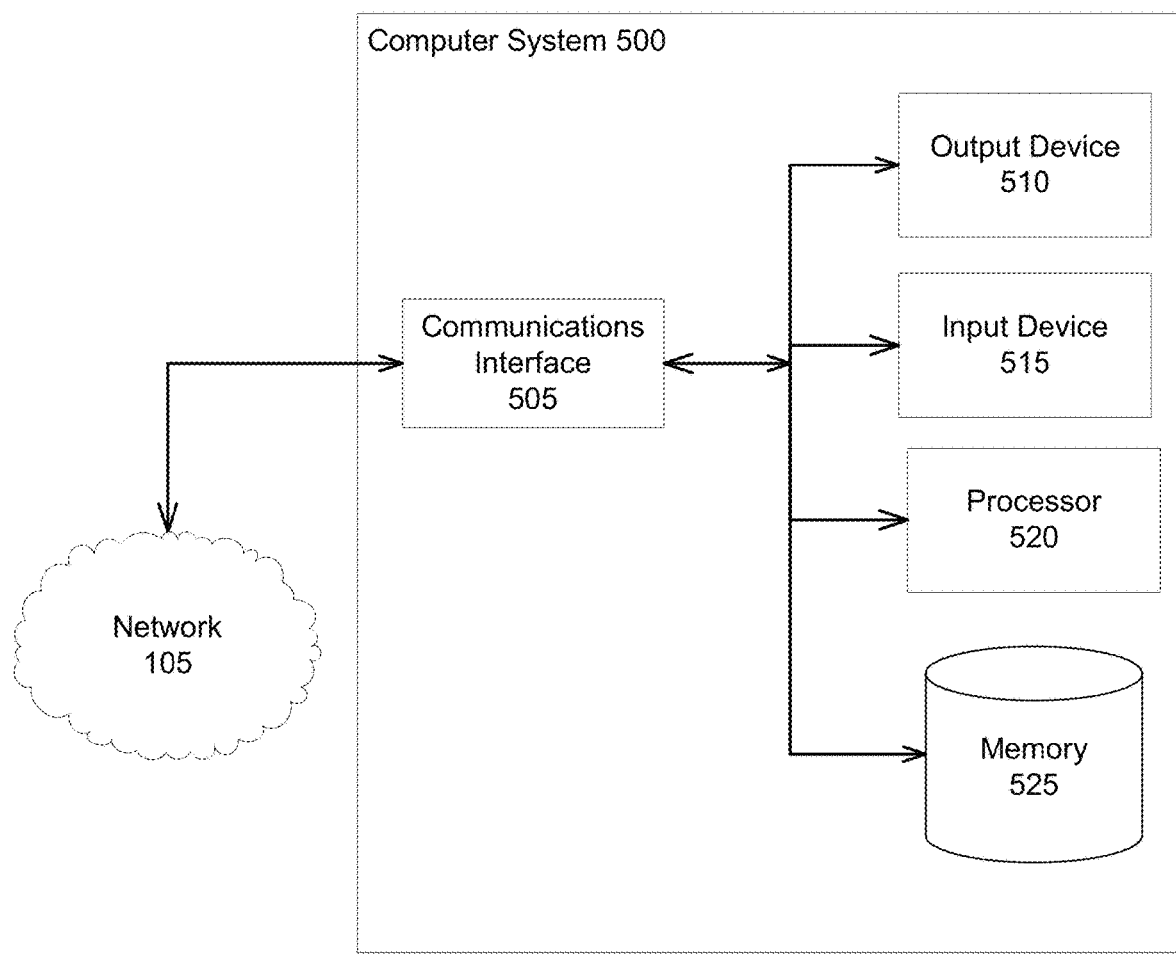
FIG. 5 is a block diagram illustrating a general architecture for a computer system that may be employed to implement elements of the systems and methods described and illustrated herein, according to an illustrative implementation.

FIG. 5 shows the general architecture of an illustrative computer system 500 that may be employed to implement any of the computer systems discussed herein (including the system 110 and its components such as the content request module 130, the content selection module 135, and script provider module 140) in accordance with some implementations. The computer system 500 can be used to provide information via the network 105 for display. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in the data processing system 110 or the other components of the system 110 such as the content request module 130, the content selection module 135, and the script provider module 140.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 525 to store information related to the availability of inventory of one or more content units, reservations of one or more content units, among others. The memory 525 can include the database 145. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to or receive information from other devices (e.g., other computer systems). While not shown explicitly in the system of FIG. 1, one or more communications interfaces facilitate information flow between the components of the system 50. In some implementations, the communications interface(s) may be configured (e.g., via various hardware components or software components) to provide a website as an access portal to at least some aspects of the computer system 500. Examples of communications interfaces 505 include user interfaces (e.g., web pages), through which the user can communicate with the data processing system 50.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content request module 130, the content selection module 135, and the script provider module 140 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 500 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content request module 130, the content selection module 135, and the script provider module 140 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of controlling display of content of information resources, comprising:
    identifying, by an application executing on client device having one or more processors, an information resource including a first content portion and a second content portion;
    setting, by the application, a displayable range of the information resource via a viewport of the application to include the first content portion and a content item on the information resource, while excluding the second content portion of the information resource;
    monitoring, by the application, for an interaction with the content item within the displayable range of the information resource; and
    modifying, by the application, responsive to detecting the interaction with the content item, the displayable range of the information resource via the viewport of the application to include the first content portion, the content item, and the second content portion.

2. The method of claim 1, wherein setting the displayable range further comprises:
    identifying an initial end of the first content portion as a first end of the displayable range of the information resource; and
    identifying a terminal end of the content item as a second end of the displayable range of the information resource.

3. The method of claim 1, further comprising:
    inserting, by the application, the content item between the first content portion and the second content portion within the information resource; and
    wherein the setting the displayable range further comprises setting the displayable range based on insertion of the content item between the first content portion and the second content portion of the information resource.

4. The method of claim 1, further comprising:
    determining, by the application, an amount of time that the content item is presented on the information resource exceeds a time threshold; and
    wherein monitoring for the interaction further comprises monitoring for the interaction responsive to determining that the amount of time exceeds the time threshold.

5. The method of claim 1, wherein setting the displayable range further comprises setting the displayable range via a scroll bar to control display of the information resource via the viewport of the application to allow scrolling on the first content portion and the content item while not allow to the second content portion; and
    wherein modifying the displayable range further comprises modifying the displayable range via the scroll bar to allow scrolling on the first content portion, the content item, and the second content portion of the information resource.

6. The method of claim 1, wherein modifying the displayable range further comprises maintaining a current display position within the viewport of the application on the information resource.

7. The method of claim 1, wherein monitoring for the interaction further comprises monitoring for the interaction with an actionable element of the content item on the displayable range.

8. A system for controlling display of content of information resources, comprising:
    an application executable on client device having one or more processors, configured to:
        identify an information resource including a first content portion and a second content portion;
        set a displayable range of the information resource via a viewport of the application to include the first content portion and a content item on the information resource, while excluding the second content portion of the information resource;
        monitor for an interaction with the content item within the displayable range of the information resource; and
        modify, responsive to detecting the interaction with the content item, the displayable range of the information resource via the viewport of the application to include the first content portion, the content item, and the second content portion.

9. The system of claim 8, wherein the application is further configured to set the displayable range by:
    identifying an initial end of the first content portion as a first end of the displayable range of the information resource; and
    identifying a terminal end of the content item as a second end of the displayable range of the information resource.

10. The system of claim 8, wherein the application is further configured to:
    insert the content item between the first content portion and the second content portion within the information resource; and
    set the displayable range based on insertion of the content item between the first content portion and the second content portion of the information resource.

11. The system of claim 8, wherein the application is further configured to:

determine an amount of time that the content item is presented on the information resource exceeds a time threshold; and monitor for the interaction responsive to determining that the amount of time exceeds the time threshold.

12. The system of claim 8, wherein the application is further configured to:

set the displayable range via a scroll bar to control display of the information resource via the viewport of the application to allow scrolling on the first content portion and the content item while not allow to the second content portion; and modify the displayable range via the scroll bar to allow scrolling on the first content portion, the content item, and the second content portion of the information resource.

13. The system of claim 8, wherein the application is further configured to maintain a current display position within the viewport of the application on the information resource.

14. The system of claim 8, wherein the application is further configured to monitor for the interaction with an actionable element of the content item on the displayable range.

15. The system of claim 8, wherein the application is further configured to invoke a content display management script to set the displayable range, to monitor for the interaction, and to modify the displayable range.

16. A method of controlling display of content of information resources, comprising:

receiving, by a data processing system having one or more processors, a request for content from an application executing on a client device; and transmitting, by the data processing system, a content display management script to the client device causing the application on the client device to:

identify an information resource including a first content portion and a second content portion;

set a displayable range of the information resource via a viewport of the application to include the first content portion and a content item on the information resource, while excluding the second content portion of the information resource;

monitor for an interaction with the content item within the displayable range of the information resource; and modify, responsive to detecting the interaction with the content item, the displayable range of the information resource via the viewport of the application to include the first content portion, the content item, and the second content portion.

17. The method of claim 16, wherein the content display management script further causes the application to set the displayable range by:

identifying an initial end of the first content portion as a first end of the displayable range of the information resource; and identifying a terminal end of the content item as a second end of the displayable range of the information resource.

18. The method of claim 16, wherein the content display management script further causes the application to:

insert the content item between the first content portion and the second content portion within the information resource; and set the displayable range based on insertion of the content item between the first content portion and the second content portion of the information resource.

19. The method of claim 16, wherein the content display management script further causes the application to:

determine an amount of time that the content item is presented on the information resource exceeds a time threshold; and monitor for the interaction responsive to determining that the amount of time exceeds the time threshold.

20. The method of claim 16, wherein the content display management script further causes the application to:

set the displayable range via a scroll bar to control display of the information resource via the viewport of the application to allow scrolling on the first content portion and the content item while not allow to the second content portion; and modify the displayable range via the scroll bar to allow scrolling on the first content portion, the content item, and the second content portion of the information resource.

\* \* \* \* \*